United States Patent
Morsy et al.

(10) Patent No.: US 10,738,469 B2
(45) Date of Patent: Aug. 11, 2020

(54) INTEGRAL TILE/FOAM BUILDING BLOCK AND METHOD FOR MAKING SAME

(71) Applicant: King Saud University, Riyadh (SA)

(72) Inventors: Mohamed S Morsy, Riyadh (SA); Tarek H Almusallam, Riyadh (SA); Husain Abbas, Riyadh (SA); Yousef A Al-Salloum, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 294 days.

(21) Appl. No.: 14/538,925

(22) Filed: Nov. 12, 2014

(65) Prior Publication Data

US 2016/0130811 A1  May 12, 2016

(51) Int. Cl.
*E04C 1/41* (2006.01)
*B32B 5/18* (2006.01)
(Continued)

(52) U.S. Cl.
CPC .................. *E04C 1/41* (2013.01); *B32B 5/18* (2013.01); *B32B 5/22* (2013.01); *B32B 5/32* (2013.01); *C04B 28/006* (2013.01); *B29K 2103/04* (2013.01); *B29K 2105/04* (2013.01); *B29L 2031/776* (2013.01); *B32B 2266/0228* (2013.01); *B32B 2266/0278* (2013.01); *B32B 2266/0285* (2013.01); *B32B 2305/022* (2013.01); *B32B 2307/102* (2013.01); *B32B 2307/304* (2013.01); *B32B 2307/3065* (2013.01); *B32B 2307/712* (2013.01); *B32B 2307/718* (2013.01); *B32B 2419/00* (2013.01);
(Continued)

(58) Field of Classification Search
CPC ....................................................... E04C 1/41
See application file for complete search history.

(56) References Cited

U.S. PATENT DOCUMENTS

| | | | |
|---|---|---|---|
| 4,171,985 A | 10/1979 | Motoki et al. | |
| 5,028,569 A * | 7/1991 | Cihon | C04B 33/13 264/660 |

(Continued)

FOREIGN PATENT DOCUMENTS

| | | | | |
|---|---|---|---|---|
| EP | 2545239 B1 * | 1/2015 | ........... | C04B 28/006 |
| WO | WO 2013148846 A1 * | 10/2013 | ............. | B32B 5/245 |

OTHER PUBLICATIONS

Duxson, P.; Lukey, G.; van Deventer, J.; "Physical Evolution of Na-Geopolymer Derived from Metakaolin up to 1000 C"; Journal of Materials Science, 2007, vol. 42. p. 3044-3054.*

*Primary Examiner* — Mark Ruthkosky
*Assistant Examiner* — Julia L Rummel
(74) *Attorney, Agent, or Firm* — Hauptman Ham, LLP

(57) ABSTRACT

An integral dual module geopolymer building block includes an inner foam module for insulation and an outer dense tile surface on an outer side of the inner foam module for weather protection. The outer porous module comprises a geopolymer paste including sodium silicate and sodium hydroxide flakes dissolved in the sodium silicate to form an activated solution and adding calcined kaolin clay to the activated solution to form a geopolymer paste. A first relatively dense tile layer has a thickness of about 0.5 cm to 1.5 cm. A second geopolymer layer made from a second mass of paste mixed with hydrogen peroxide forms a geopolymer foam having a thickness of between 5 cm and 15 cm.

2 Claims, 2 Drawing Sheets

(51) Int. Cl.
  *B32B 5/22*     (2006.01)
  *B32B 5/32*     (2006.01)
  *C04B 28/00*    (2006.01)
  *B29K 105/04*    (2006.01)
  *B29K 103/04*    (2006.01)
  *B29L 31/00*     (2006.01)
  *C04B 111/00*    (2006.01)
  *C04B 111/28*    (2006.01)

(52) U.S. Cl.
  CPC ....... *B32B 2419/04* (2013.01); *B32B 2607/00* (2013.01); *C04B 2111/00534* (2013.01); *C04B 2111/00612* (2013.01); *C04B 2111/28* (2013.01)

(56) References Cited

U.S. PATENT DOCUMENTS

| | | |
|---|---|---|
| 7,316,099 B2 | 1/2008 | Faulkner et al. |
| 8,266,858 B2 | 9/2012 | Teng |
| 8,536,250 B2 | 9/2013 | Briand et al. |
| 8,562,735 B2 | 10/2013 | Allouche et al. |
| 2004/0145215 A1* | 7/2004 | Taguchi ................ B61D 17/08 296/187.02 |
| 2011/0281066 A1* | 11/2011 | Andrews ................... B32B 3/10 428/141 |
| 2012/0159877 A1* | 6/2012 | Reid ....................... E04C 2/049 52/173.1 |

* cited by examiner

INTEGRAL TILE/FOAM BUILDING BLOCK AND METHOD FOR MAKING SAME

FIELD OF THE INVENTION

This invention relates to an integral tile/foam geopolymer building block and method for making the geopolymer tile/foam block and more particularly to a tile/foam block with a dense tile structure for weather protection and an inner foam structure for insulation.

BACKGROUND OF THE INVENTION

External wall insulation typically involves fixing a layer of insulation material to the wall and covering it with plaster or cladding. This provides a two layer system, one for insulation and the other for weather protection. Such methods are also adapted for thermal insulation of existing walls. A further method for insulation employs two layers of hollow block walls with an inner layer of the wall being relatively thick. In such arrangements, the two layers are separated by a thermal insulation layer.

The two layer systems are expensive and time consuming. In addition, the attachment of the layers requires care to prevent detachment. Accordingly, there have been a number of approaches for finding a more efficient and less costly approach to an improved insulation and wall construction. For example, a U.S. patent of Motaki et al. U.S. Pat. No. 4,171,985 discloses Foamable Heat Insulating Compositions Containing Alkali Silicate and Alumina Cement. As disclosed a process for manufacturing inorganic heat insulating material by mixing up water-soluble alkali silicate, alumina cement, metal base, foaming agent and foam stabilizing agent into a pasty state in the presence of water. The heat insulating material is manufactured by this process and is useful for heat insulating walls of buildings and for insulating plates incorporated in machinery.

A more recent U.S. Pat. No. 7,316,099 of Faulkner et al. is directed to a Spaced Sheathing Roofing System and Method of Installing the Same. The system and method for roof cladding is placed onto batten strips positioned on roof rafters. The roof cladding is attached using an adhesive. The attachment component is preferably a polymer adhesive, more preferably a polyurethane, for adhering to the roof cladding. The adhesive is preferably sprayed onto the lower surface of the roof cladding while also being sprayed onto the batten strips and the supporting truss rafters. The sprayed adhesive bonds the adjacent roof cladding together and also bonds the roof cladding to the batten strips to form a monolithic structure. In addition, the sprayed layer of adhesive forms an insulation layer while also forming a waterproof barrier.

Notwithstanding the above, it is presently believed there is a need for an improved tile/foam insulation material. There should be a need and a potential commercial market because the system provides costs and time savings for contractors and in the construction of buildings.

BRIEF SUMMARY OF THE INVENTION

In essence, the present invention contemplates an integral dual module geopolymer building block that is made of an inner foam module for insulation and an outer dense tile surface on an outer side of the inner foam module for weather protection. The dual module has an outer dense module comprising a geopolymer paste including sodium silicate and sodium hydroxide flakes dissolved in the sodium silicate to form an activating solution, and calcined kaolin clay mixed with the activating solution to form a mass of geopolymer paste.

A first relatively dense tile layer with a thickness of about 0.5 to 1.5 cm is formed from a first mass of geopolymer paste. A second foam layer of a geopolymer paste is made from a second mass of geopolymer paste with hydrogen peroxide ($H_2O_2$) added. The $H_2O_2$ (35% concentration) is mixed with the geopolymer paste and varies from about 0.5% to about 2.0% by wgt. of geopolymer paste to form a geopolymer foam having a thickness of about 5 cm to about 15 cm. The module is then cured at about 40° C. for one hour and at about 80° C. for about 23 hours.

The invention will now be described in connection with the accompanying figures.

DESCRIPTION OF THE DRAWINGS

FIG. 1 is a flowchart illustrating the method for making an integral dual modular geopolymer building block; and.

DETAILED DESCRIPTION OF THE PREFERRED EMBODIMENTS OF THE INVENTION

Figure 1:
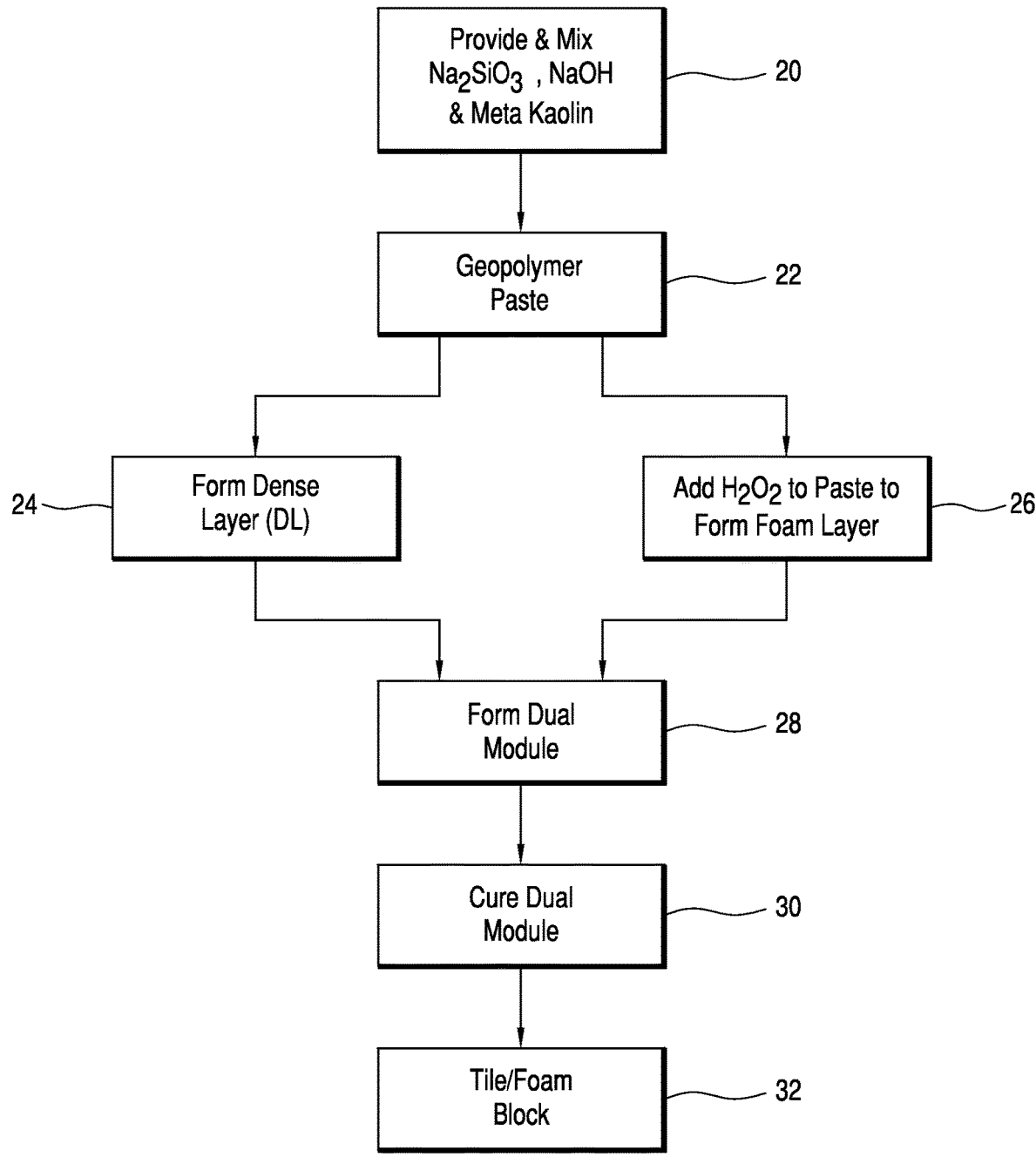
Figure 2:
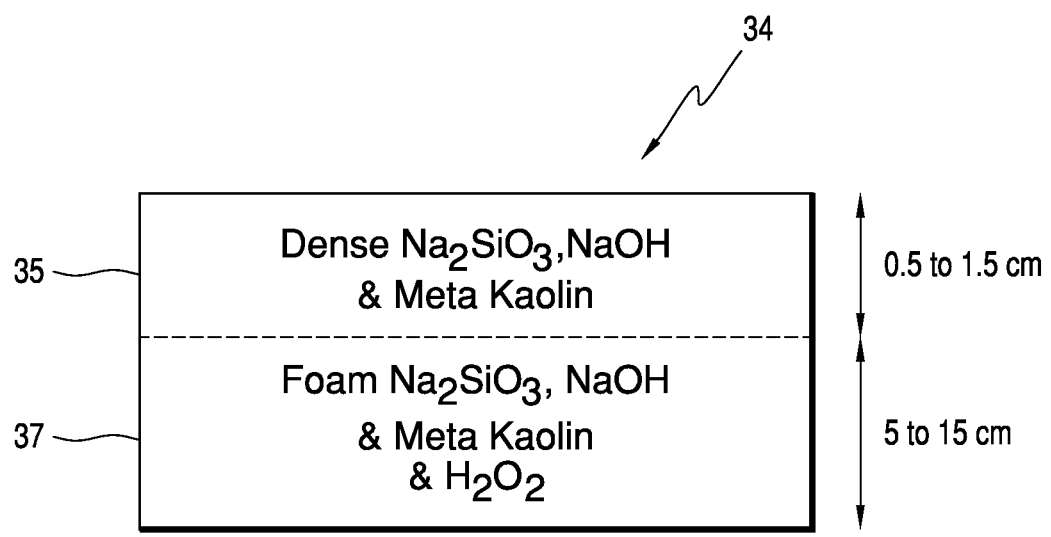
FIG. 2 is a schematic illustration of an integral dual modular geopolymer building block in accordance with the invention.

The production of an integral dual modular geopolymer building block involves the use of metakaolin clay that is calcined at 700° C.-800° C. for about 3 hours. In an initial step a geopolymer paste is made by providing and mixing sodium silicate ($Na_2SiO_3$), sodium hydroxide (NaOH) flakes dissolved in the sodium silicate and calcined kaolin clay to form a mass of a geopolymer paste as indicated in steps 20 and 22.

The so formed geopolymer paste in step 22 is divided into two groups. For example, the next step 24 calls for forming a dense layer (DL) made from the geopolymer paste while in step 26 a thicker layer of geopolymer foam is made from mixing a second mass of geopolymer paste with hydrogen peroxide ($H_2O_2$). The dense layer of step 24 can precede or follow the step 26 while the step 26 can precede or follow the step 24. In either case, a dual module with a foam relatively thick layer for insulation of about 5 to about 15 cm with a relatively thin layer of dense geopolymer of about 0.5 to about 1.5 cm is formed for weather resistance.

The dual module of step 28 is then cured at about 40° C. for about 1 hour and at about 80° C. for about 23 hours in step 30 to produce a final product namely a tile/foam building block in step 32.

In the aforementioned example, the oxide composition of the calcined kaolin clay was as follows:

TABLE 1

| Oxide composition of kaolin | |
|---|---|
| Oxides | Percent |
| CaO | 0.35 |
| $SiO_2$ | 44.60 |
| $Al_2O_3$ | 36.89 |
| $Fe_2O_3$ | 0.29 |
| $SO_3$ | 0.13 |
| $K_2O$ | 0.05 |
| $TiO_2$ | 3.04 |
| $P_2O_5$ | 0.08 |
| Total = | 85.08 |
| Ignition loss = | 14.92 |

The invention forming the object of this specification relates to the development of a novel lightweight, low-cost and fire resistant geopolymer tile-foam for thermal and sound insulation as well as weather protection of external walls.

The characteristic details of this novel system are clearly shown in the following description and following the same reference signs for indicating it.

The production of geopolymer tile-foam involves the use of metakaolin obtained from the calcination of locally available kaolin at 700-800° C. for about 3 hours. The typical oxide composition of Kaolin is given in Table 1. The resulting metakaolin had high silica content with the mole ratio of $SiO_2:Al_2O_3=2.6$. The fineness of metakaolin should not be coarser than 40 microns. Other materials used are sodium silicate and sodium hydroxide. Sodium silicate consisting of 7.9% $Na_2O$, 26.0% $SiO_2$ and 66.1% $H_2O$, with a weight ratio of $SiO_2/Na_2O=3.29$, and specific gravity at 20° C.=1.35 was used. Hydrogen peroxide is used for making the foam portion of the tile.

The typical composition of geopolymer is given in Table 2. NaOH in pellet form with 97% purity was used. For foamed geopolymer, 2.0% (Range: 1.5% to 2.5%) hydrogen peroxide of 35% concentration is added to the geopolymer paste.

The procedure of the production of geopolymer is described in the following:

Dissolve Sodium hydroxide flakes in sodium silicate to form alkaline activator solution.

Add alkaline activator solution to the metakaolin. This leads to the formation of geopolymer paste.

For foam part of the Geopolymer tile-foam, mix hydrogen peroxide to the geopolymer paste during mixing so as to form the foamed geopolymer.

TABLE 2

Composition of geopolymer

| Material | Percent range | Percent used |
| --- | --- | --- |
| Metakaolin | 45-55 | 48 |
| Sodium silicate (Liquid alkaline, 40% NaO) | 40-45 | 43.5 |
| Sodium hydroxide flakes | 7-10 | 8.5 |
| Total = | | 100 |

The geopolymer composition does not involve inclusion of any conventional cement compositions, such as Ordinary Portland Cement thus reducing the greenhouse gas (i.e. carbon dioxide) emission and hence protecting the environment.

The geopolymer material was produced in the laboratory using the composition given in Table 2 and employing the aforesaid procedure. The 7 days compressive strength of geopolymer was found to be 27.3 MPa whereas the compressive strength of the geopolymer foam was found to vary from 6.5 to 1 MPa corresponding to the variation in the amount of hydrogen peroxide varying from 0.5% to 2.0%. The density of geopolymer was 1640 $kg/m^3$ whereas the density of geopolymer foam was found to vary from 970 to 430 $kg/m^3$.

The approximate weight of one tile of 15×15 cm would be:

1 cm solid and 4 cm foam: 0.387 kg
1 cm solid and 14 cm foam: 1.355 kg

The Geopolymer tile-foam is produced by pouring a layer of geopolymer paste for a solid layer followed by another layer of foam-geopolymer paste for the porous layer. The thickness of solid and porous layers may be decided based on the thermal protection requirement. The thickness of solid layer may be kept as about 1 cm, whereas the typical thickness of porous layer may vary from 5 to 15 cm depending on the thermal insulation requirement. For curing, the geopolymer is kept at 40° C. for about an hour and then kept at 80° C. for about another 23 hours.

The tile is dimensionally stable and demonstrates long-term durability without any sign of volume change or distortions even in extreme weather conditions.

The traditional insulation system employs a layer of insulation material such as expanded polystyrene (thermocol), mineral wool, polyurethane foam or phenolic foam, which is inserted in the cavity of hollow blocks. This practice of thermal insulation leaves thermal bridges which make it less effective in controlling the heat transfer across the wall. Whereas the use of a continuous surface of thermal insulation requires attachments not only for connecting the insulation layer with the wall but also for the connection of outer tiles with the wall.

The foam being a composite part of the Geopolymer tile-foam, there is a good bond between the two materials which is otherwise weak or almost non-existent in conventional two-layer systems consisting of insulation and weather protection layers.

Exposed surface of the tile may have any desired color for which color additives may be used. The exposed surface of the tile may also have a better finish and pleasing texture by using good quality molds and using additives in the outer geopolymer layer of the Geopolymer foam-tile.

Thermal conductivity of solid and porous layers of the tile determined using thermal conductivity meter are 0.43 and 0.09 W/m K respectively. Thus the thermal resistance (R-value) of 1 cm thick solid and 5 cm foam layers of the tiles are 0.02 and 0.56 $m^2K/W$ respectively. The thermal resistance of the foam layer of the tiles can be increased to 1.11 by increasing its thickness to 10 cm.

The use of these tiles on external walls leads to a 20% energy saving which is almost the same as that achieved when expanded polystyrene is used.

Because of the use of geopolymer and especially the geopolymer foam, the tiles are expected to possess improved fire rating and better acoustics.

The tiles in accordance with the present invention can be produced in different sizes and different thicknesses of solid and foam layers depending upon the field requirements.

For the connection of the tile with the wall, a layer of traditional cement mortar may be used. The thickness of mortar may be around 25 mm (FIG. 3). Other adhesive materials such as epoxy mortar, latex or acrylic mortar may also be used. For thicker tiles, in addition to the adhesive, mechanical anchorage may also be used for proper connection of tiles with the wall.

An integral geopolymer building block 34 includes a first or outer relatively thin layer 35 of a dense geopolymer paste made from sodium silicate and sodium hydroxide flakes dissolved in the sodium silicate and calcined kaolin clay. A second or inner insulating layer of step 37 is made from sodium silicate and sodium hydroxide flakes dissolved in sodium silicate and calcined kaolin clay and hydrogen peroxide. The first layer of step 35 has a thickness of about 0.5 cm to about 1.5 cm while the second layer 37 has a thickness of about 5 cm to 15 cm.

While the invention has been described in connection with its preferred embodiment, it should be recognized that changes and modifications may be made therein without departing from the scope of the appended claims.

What is claimed is:

1. An integral dual layer building block consisting of:
an inner foam module for insulation and an outer dense tile module on an outer side of the inner foam module for weather protection; and
wherein said dense tile module consists of: a layer formed by curing a first mass of a geopolymer paste consisting of a mixture of an activating solution formed by dissolving sodium hydroxide flakes into an aqueous, 25 to 55 wt. % sodium silicate solution and calcined kaolin clay;
wherein said calcined kaolin clay comprises about 45 wt. % silica ($SiO_2$), about 37 wt. % alumina ($Al_2O_3$), and about 4 wt. % of other oxides;
wherein the calcined kaolin clay is calcined at 700-800° C. for about three hours;
wherein the fineness of the calcined kaolin clay is no coarser than forty (40) microns; and
said dense tile module has a thickness of about 0.5 to 1.5 cm; and
wherein said inner foam module consists of: a layer formed by curing a geopolymer foam consisting of a second mass of the geopolymer paste mixed with 0.5 to 2 wt. % of an aqueous 35% hydrogen peroxide ($H_2O_2$) solution based on the weight of the second mass of the geopolymer paste, to form a geopolymer foam having a thickness of between 5 cm and 15 cm; and
wherein said modules are cured at about 40° C. for one hour and at about 80° C. for about 23 hours to obtain the integral dual layer building block.

2. The integral dual layer building block according to claim 1, wherein:
the dense tile module has a density of about 1640 kg/m$^3$; and the inner foam module has a density of about 430 to about 970 kg/m$^3$.

* * * * *